US009813848B2

(12) United States Patent
Verma et al.

(10) Patent No.: US 9,813,848 B2
(45) Date of Patent: *Nov. 7, 2017

(54) MIRRORLINK WITH WIRELESS SERIAL BUS

(71) Applicant: QUALCOMM Incorporated, San Diego, CA (US)

(72) Inventors: Lochan Verma, San Diego, CA (US); Vijayalakshmi Rajasundaram Raveendran, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,125

(22) Filed: Mar. 27, 2017

(65) Prior Publication Data

US 2017/0201855 A1  Jul. 13, 2017

Related U.S. Application Data

(63) Continuation of application No. 14/539,632, filed on Nov. 12, 2014, now Pat. No. 9,641,960.

(51) Int. Cl.
*G06F 15/16* (2006.01)
*H04W 4/00* (2009.01)
(Continued)

(52) U.S. Cl.
CPC ......... *H04W 4/008* (2013.01); *H04L 41/0809* (2013.01); *H04L 41/0896* (2013.01);
(Continued)

(58) Field of Classification Search
CPC .......................... H04W 76/023; H04W 8/005
See application file for complete search history.

(56) References Cited

U.S. PATENT DOCUMENTS 9,641,960 B2    5/2017  Verma et al.
2005/0058066 A1*  3/2005  Sung ................... H04L 12/2805
                                              370/229
(Continued)

FOREIGN PATENT DOCUMENTS

WO      2014171956 A1    10/2014

OTHER PUBLICATIONS

Aumo, et al., "Car Connectivity Consortium: Mirrorlink and the Connected Car" presented at Car Connectivity consortium Opening Session, Mar. 26, 2015, 100 pp.
(Continued)

*Primary Examiner* — Hieu Hoang
(74) *Attorney, Agent, or Firm* — Shumaker & Sieffert, P.A.

(57) ABSTRACT

A first computing device includes a memory, and at least one processor. The at least one processor may be configured to establish a wireless connection to a second computing device using a Wi-Fi Direct Application Services Platform (ASP), transmit data from a car connectivity consortium (CCC) Information Element (IE) to the second computing device, and establish a MirrorLink session using Universal Plug and Play (UPnP) to the second computing device via the wireless connection. The at least one processor may be further configured to establish a Wireless Serial Bus (WSB) session to the second computing device using the Wi-Fi Direct ASP via the wireless connection, and transmit data via the WSB session to the second computing device.

19 Claims, 7 Drawing Sheets

(51) Int. Cl.
  *H04L 29/08* (2006.01)
  *H04W 76/02* (2009.01)
  *H04L 12/24* (2006.01)
  *H04W 8/00* (2009.01)

(52) U.S. Cl.
  CPC ............ *H04L 67/12* (2013.01); *H04L 67/141* (2013.01); *H04L 67/16* (2013.01); *H04W 76/023* (2013.01); *H04W 8/005* (2013.01)

(56) References Cited

U.S. PATENT DOCUMENTS

| | | | |
|---|---|---|---|
| 2007/0005768 A1* | 1/2007 | Won | H04L 65/4084 709/225 |
| 2007/0043941 A1* | 2/2007 | Kunito | H04M 3/387 713/150 |
| 2010/0293290 A1* | 11/2010 | Arashin | H04L 12/66 709/232 |
| 2012/0005323 A1* | 1/2012 | Li | H04L 65/1026 709/223 |
| 2013/0204962 A1* | 8/2013 | Estevez | H04N 7/185 709/217 |
| 2014/0120829 A1 | 5/2014 | Bhamidipati et al. | |
| 2014/0229627 A1 | 8/2014 | Maeng et al. | |
| 2014/0314065 A1 | 10/2014 | Song et al. | |
| 2014/0355585 A1 | 12/2014 | Sadeghi et al. | |
| 2015/0156706 A1 | 6/2015 | Sadeghi et al. | |
| 2015/0327313 A1* | 11/2015 | Kim | H04W 80/10 370/329 |
| 2015/0365513 A1 | 12/2015 | Lee et al. | |
| 2015/0365981 A1 | 12/2015 | Thanayankizil et al. | |
| 2016/0134996 A1 | 5/2016 | Verma et al. | |
| 2016/0219423 A1* | 7/2016 | Lee | H04W 8/005 |

OTHER PUBLICATIONS

International Search Report and Written Opinion from International Application No. PCT/US2015/055345, dated Jan. 18, 2016, 13 pp.
"Media Agnostic Universal Serial Bus Draft Specification," Version 1.0 RC, Jan. 2014, 170 pp.
Response to Second Written Opinion dated Oct. 14, 2016, from International Application No. PCT/US2015/055345, filed on Nov. 8, 2016, 10 pp.
Response to Written Opinion dated Jan. 18, 2016, from International Application No. PCT/US2015/055345, filed on Aug. 25, 2016, 6 pp.
Second Written Opinion from International Application No. PCT/US2015/055345, dated Oct. 14, 2016, 10 pp.
"Wi-Fi Serial Bus Technical Specifciation," Wi-Fi Alliance Technical Committee, Wi-Fi Serial Bus Technical Task Group, Draft Version 0.05, Apr. 7, 2014, 21 pp.
International Preliminary Report on Patentability from International Application No. PCT/US2015/055345, dated Jan. 24, 2017, 10 pp.

* cited by examiner

MIRRORLINK WITH WIRELESS SERIAL BUS

This application is a continuation of U.S. application Ser. No. 14/539,632, filed Nov. 12, 2014, the entire content of which is incorporated herein by reference.

TECHNICAL FIELD

This disclosure relates to the MirrorLink interoperability standard.

BACKGROUND

Automobiles and other vehicles may feature a component, referred to as a "head unit." A head unit may provide information and entertainment system functionality (i.e., infotainment). The head unit may play media, such as music, video or other multimedia output to passengers at one or more locations within the vehicle. The head unit may also include functionality that allows a passenger to connect external devices to the head unit.

MirrorLink™ is an interoperability standard comprising a suite of protocols for connecting external devices, such as a smartphone, flash drive, tablet, laptop, and/or external hard drive with a head unit. The MirrorLink™ standard utilizes technologies, such as USB (Universal Serial Bus), Wi-Fi, Bluetooth, and UPnP (Universal Plug and Play), Wi-Fi Display for transmitting data to and receiving data from the head unit or one or more devices connected to the head unit.

SUMMARY

In general, this disclosure describes techniques for incorporating wireless serial bus (WSB) functionality into the MirrorLink™ (ML) standard. WSB is a standard for connecting Universal Serial Bus (USB) devices over a high-speed (e.g., Ultra Wide Band or Wi-Fi) wireless connection. The current implementation of MirrorLink™ does not support WSB. The techniques of this disclosure are directed toward adding support for the WSB to MirrorLink™.

The techniques of this disclosure may allow WSB-compatible devices to interoperate with an ML-compatible head unit. As another example, the incorporated WSB functionality may provide an additional high-speed protocol for transmitting data. Such data may include file data, streaming video and/or audio as some examples.

In one example, a method of wirelessly transmitting data includes establishing a wireless connection between a first wireless computing device and a second computing device using a Wi-Fi Direct Application Services Platform (ASP), transmitting, by the first wireless computing device and to the second wireless computing device, data from a car connectivity consortium (CCC) Information Element (IE), establishing, by the first computing device and to the second computing device, a MirrorLink session using Universal Plug and Play (UPnP) via the wireless connection, selecting, by the first computing device and to the second computing device, wireless serial bus (WSB) as a protocol for the MirrorLink session, establishing, by the first wireless computing device and to the second wireless computing device, a WSB session for use with the MirrorLink session using the Wi-Fi Direct ASP via the wireless connection, and transmitting, by the first wireless computing device and to the second wireless computing device, data via the WSB session.

In another example, a computing device comprises a memory and at least one processor. The at least one processor is configured to: establish a wireless connection to a second computing device using a Wi-Fi Direct Application Services Platform (ASP), transmit data from a car connectivity consortium (CCC) Information Element (IE) to the second computing device, establish a MirrorLink session using Universal Plug and Play (UPnP) to the second computing device via the wireless connection, establish a Wireless Serial Bus (WSB) session to the second computing device using the Wi-Fi Direct ASP via the wireless connection, and transmit data via the WSB session to the second computing device.

In another example, a device comprises: means for establishing a wireless connection between a first wireless computing device and a second computing device using a Wi-Fi Direct Application Services Platform (ASP), means for transmitting, by the first wireless computing device and to the second wireless computing device, data from a car connectivity consortium (CCC) Information Element (IE), means for establishing, by the first computing device and to the second computing device, a MirrorLink session using Universal Plug and Play (UPnP) via the wireless connection, means for selecting, by the first computing device and to the second computing device, wireless serial bus (WSB) as a protocol for the MirrorLink session, means for establishing, by the first wireless computing device and to the second wireless computing device, a WSB session for use with the MirrorLink session using the Wi-Fi Direct ASP via the wireless connection, and means for transmitting, by the first wireless computing device and to the second wireless computing device, data via the WSB session.

In another example, a non-transitory computer-readable storage medium includes instructions stored thereon that when executed cause at least one processor to: establish a wireless connection to a second computing device using a Wi-Fi Direct Application Services Platform (ASP), transmit data from a car connectivity consortium (CCC) Information Element (IE) to the second computing device, establish a MirrorLink session using Universal Plug and Play (UPnP) to the second computing device via the wireless connection, establish a Wireless Serial Bus (WSB) session to the second computing device using the Wi-Fi Direct ASP via the wireless connection, and transmit data via the WSB session to the second computing device.

The details of one or more examples of the disclosure are set forth in the accompanying drawings and the description below. Other features, objects, and advantages will be apparent from the description and drawings, and from the claims.

DETAILED DESCRIPTION

MirrorLink™ (ML) is a device interoperability standard developed by the Car Connectivity Consortium (CCC). MirrorLink™ may also be referred to as Terminal Mode and is described in the MirrorLink™ 1.1.0 and 1.2.0 Device Specification. One goal of MirrorLink™ is to offer safe and seamless integration between a smartphone and a vehicle's infotainment system. MirrorLink™ may transform smartphones or other computing devices into vehicular application platforms where applications are hosted and run on the smartphone or other computing device while drivers and passengers interact with the apps through steering wheel controls, dashboard buttons, and/or touch screens of the vehicle's In-Vehicle Infotainment (IVI) system. MirrorLink™ utilizes a set of well-established, non-proprietary technologies such as IP (Internet Protocol), USB (Universal Serial Bus), Wi-Fi, Bluetooth, Real-Time Protocol (RTP, for audio) and Universal Plug and Play (UPnP). In addition, MirrorLink™ may use Virtual Network Computing (VNC) or Wi-Fi Display (WFD) protocol to display the user interface of the smartphone applications on IVI screens and to communicate user input back to the smartphone.

A computing device configured to implement MirrorLink™ in accordance with the techniques of this disclosure may support the use of a Wireless Serial Bus (WSB) for data transfer, such as for audio and/or video transfer during a MirrorLink™ session. For example, a computing device configured in accordance with the techniques of this disclosure may transmit a user interface or video data of a smartphone to the head unit for display using WSB as part of a MirrorLink™ session. Additionally, this disclosure describes a new procedure for performing MirrorLink™ device discovery. This new device discovery procedure may use the Wi-Fi Direct Application Services Platform (ASP) as part of the MirrorLink™ device discovery procedure.

Figure 1:
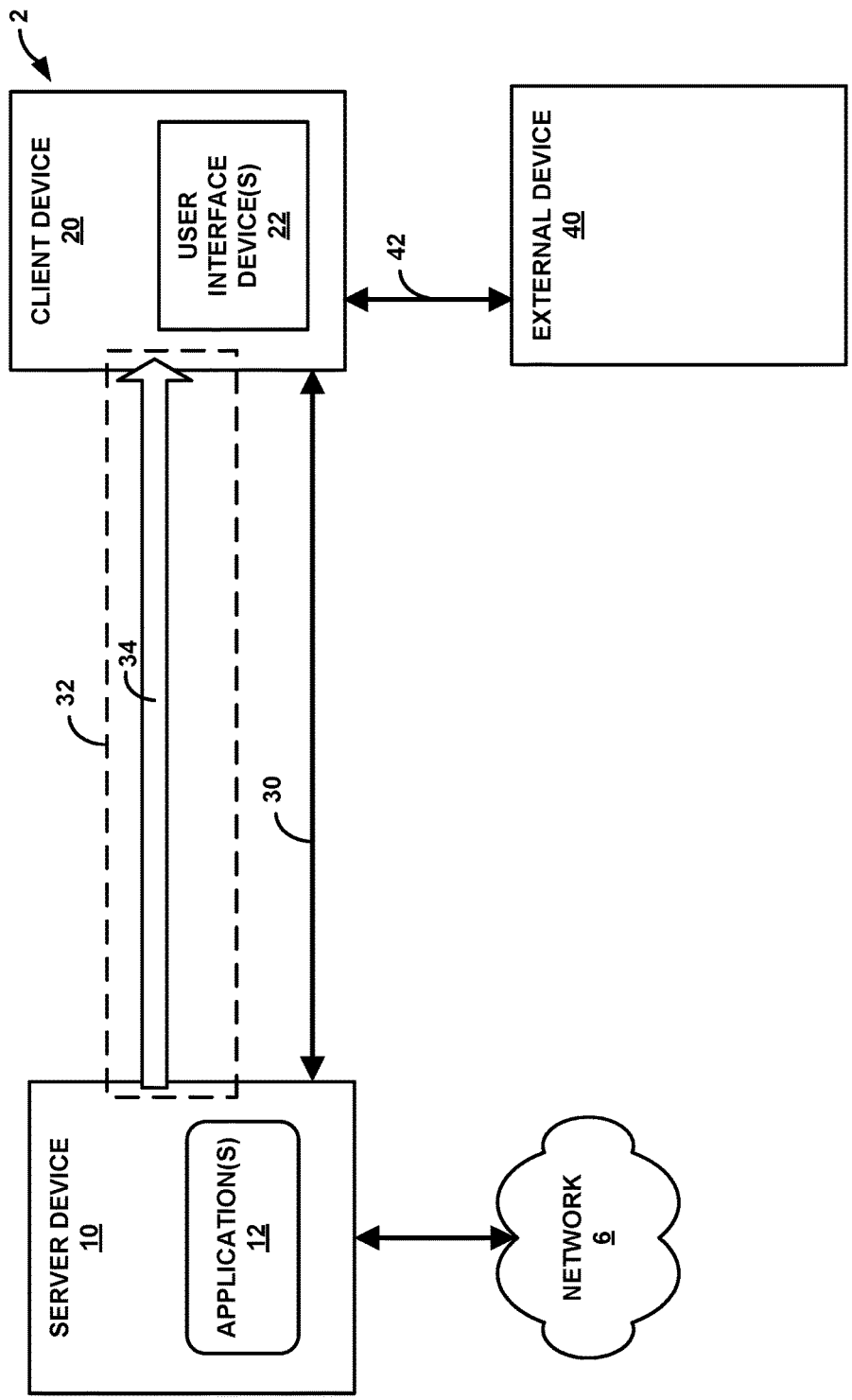
FIG. 1 is a block diagram illustrating an example of a wireless communication system operating in accordance with the techniques of this disclosure.

FIG. 1 is a block diagram illustrating an example of a wireless communication system operating in accordance with the techniques of this disclosure. Wireless communication system 2 includes server device 10 executing one or more applications 12. Server device 10 may represent a mobile computing device configured to act as an MirrorLink™ server, including but not limited to a mobile phone, a tablet computer, a personal digital assistant, a handheld computer, a media player, and the like, or a combination of two or more of these items. Server device 10 may communicate with a network 6 by a wireless communication link to, e.g., receive media data, from a server accessible by network 6. In some aspect, server device 10 may additionally, or alternatively, represent a standalone source device that sources media data from computer-readable storage media of the source device (not shown in FIG. 1).

Network 6 may represent a mobile network operated by a service provider to provide network access, data transport and other services to server device 10. In general, network 6 may implement a cellular network architecture, such as a General Packet Radio Service (GPRS) architecture, a Universal Mobile Telecommunications System (UMTS) architecture, and an evolution of UMTS referred to as Long Term Evolution (LTE), each of which are standardized by 3rd Generation Partnership Project (3GPP).

Each of applications 12 may represent an application provided by an entity that manufactures server device 10 or software operating on server device 10 or an application developed by a third-party for use with server device 10. Examples of applications 12 include applications for travel routing, maps, audio and/or video presentation, streaming video delivery and presentation, voice and/or calls, file transfer, weather, etc. Each of applications 12 may conform to the MirrorLink™ device interoperability standard developed by the Car Connectivity Consortium and may offer integration with client device 20 using MirrorLink™. A conforming one of applications 12 may alternatively be referred to herein as a "CCC application." Server device 10 may include additional applications that do not conform to MirrorLink™.

Client device 20 may in some instances represent a vehicle head unit for an automobile that is configured as a MirrorLink™ client. Client device 20 may include user interface devices 22. User interface devices 22 may include one or more input devices configured to receive input from a user through tactile, audio, or video feedback. Examples of input devices include a presence- and/or touch-sensitive display, a mouse, a keyboard, a voice responsive system, video camera, microphone, steering wheel button or knobs or other controls in the vehicle that can be pushed or rotated for, e.g., volume increase or decrease, or any other type of device for detecting a command from a user. Reference herein to a "user" of client device 20 and/or server device 10 may include a driver or passenger of an automobile or vehicle that includes client device 20. User interface devices 22 may also include one or more output devices configured to provide output to a user using tactile, audio, or video stimuli. Examples of output devices include a presence-sensitive display, a sound card, a speaker, a video graphics adapter card, a speaker, a liquid crystal display (LCD), or any other type of device for converting a signal into an appropriate form understandable to humans or machines.

Server device 10 and client device 20 may establish a layer two (L2) communication session 30 according to one or more communication protocols utilized in MirrorLink™ implementations, for example, Universal Serial Bus (USB) 2.0, USB 3.0, Wireless Ultra Wideband (UWB), Wireless Local Area Network (WLAN), Bluetooth, and/or Advanced Audio Distribution Profile (A2DP). Server device 10 and client device 20 may use Bluetooth and/or A2DP for audio input/output (I/O) through the Hands Free Profile, while using one of USB 2.0 or Wi-Fi to transport other types of application data such as video, text, and application interfaces. Wi-Fi may conform to a wireless communication standard from the IEEE 802.11 family of standards. For example, a vehicle driver may plug server device 10 into a USB-compatible cable or docking interface provided by (or connected to) a vehicle head unit that includes client device 20 to transport L2 communication session 30 signals. Alternatively, server device 10 and client device 20 may operate L2 communication session 30 wirelessly according to, e.g., a WLAN protocol such as Wi-Fi.

In some examples, client device 20 may communicate with external device 40 using one of the wired or wireless communication protocols described above. External device 40 may comprise a storage device, such as flash drive, hard drive, media reader, camera, or other storage device. For the purposes of this disclosure, external device 40 may support WSB connections over L2 communication session 30. In some examples, external device 40 may be connected to server device 10.

Server device 10 may be able to transfer data to and/or from external device 40 using a MirrorLink™ session between server device 10 and client device 20. In accordance with the techniques of this disclosure, the MirrorLink™ session may use WSB for the data transfers between server device 10 and client device 20. In some examples, server device 10 may transfer data to and/or from client device 20 using WSB, which may available as part of the MirrorLink™ session. Client device 20 may transfer data received from server device 10 to external device 40. Client device 20 may also receive data from external device 40, and transmit the received data to server device 10. Client device 20 may relay data to and from external device 40.

In some examples, L2 session 30 between client device 20 and external device 40 may utilize WSB. In other examples, L2 session 30 may utilize a protocol other than WSB. In this example, client device 20 may convert data transfers having a destination of server device 20 to WSB format. Client device 20 may convert a WSB data transfer to a protocol that client device 20 and external device 40 use for communication over L2 communication session 42.

According to techniques described herein, server device 10 and client device 20 can use L2 communication session 30 to establish a MirrorLink™ session 32 to enable client device 20 to operate as a MirrorLink™ client and enable server device 10 to operate as an MirrorLink™ server. Server device 10 and client device 20 may further utilize MirrorLink™ session 32 to establish a WSB session 34. Server device 10 and client device 20 may transfer audio, video, and/or other data using WSB session 34.

By using L2 communication session 30 to bootstrap WSB session 34, the techniques may provide seamless transfer of application output and control from server device 10 to client device 20, thus making interaction with client device 20 richer in instances in the automotive applications, i.e., in embodiments in which client device 20 includes a vehicle head unit. WSB session 34 may also improve the speed of data transfer between server device 10 client device 20, and external devices, such as external device 40.

Server device 10 and client device 20 may establish MirrorLink™ session 32 using the one or more protocols supported according to the MirrorLink™ specification. As described in greater detail below, server device 10 and client device 20 may use protocols such as Wi-Fi Direct P2P, and Universal Plug and Play (UPnP) to establish a MirrorLink™ session. During UPnP communications of L2 communication session 30, server device 10 and client device 20 may transmit a CCC Information Element (CCC IE) as part of a Wi-Fi Management Frame. The presence of the CCC IE in the Wi-Fi Management Frame may indicate that the device transmitting the CCC IE (e.g., server device 10 and/or client device 20) supports MirrorLink™. In addition to the CCC IE, may include additional information that indicates that server device 10 and client device 20 support WSB. In some examples, server device 10 and client device 20 may also use a Wi-Fi Direct ASP to establish a WSB session and to establish the MirrorLink™ session.

In accordance with the techniques of this disclosure, server device 10 may be configured to establish a wireless connection to a second computing device, such as client device 20, using a Wi-Fi Direct Application Services Platform (ASP), transmit data from a car connectivity consortium (CCC) Information Element (IE) to client device 20, and establish a MirrorLink session with client device 20 using Universal Plug and Play (UPnP) to via the wireless connection. Server device 10 may be further configured to establish a Wireless Serial Bus (WSB) session to client device 20 using the Wi-Fi Direct ASP via the wireless connection, and transmit data via the WSB session to the second computing device. Although the above example describes server device 10 as performing the above steps, the roles of server device 10 and client device 20 may be swapped in various examples.

Figure 2:
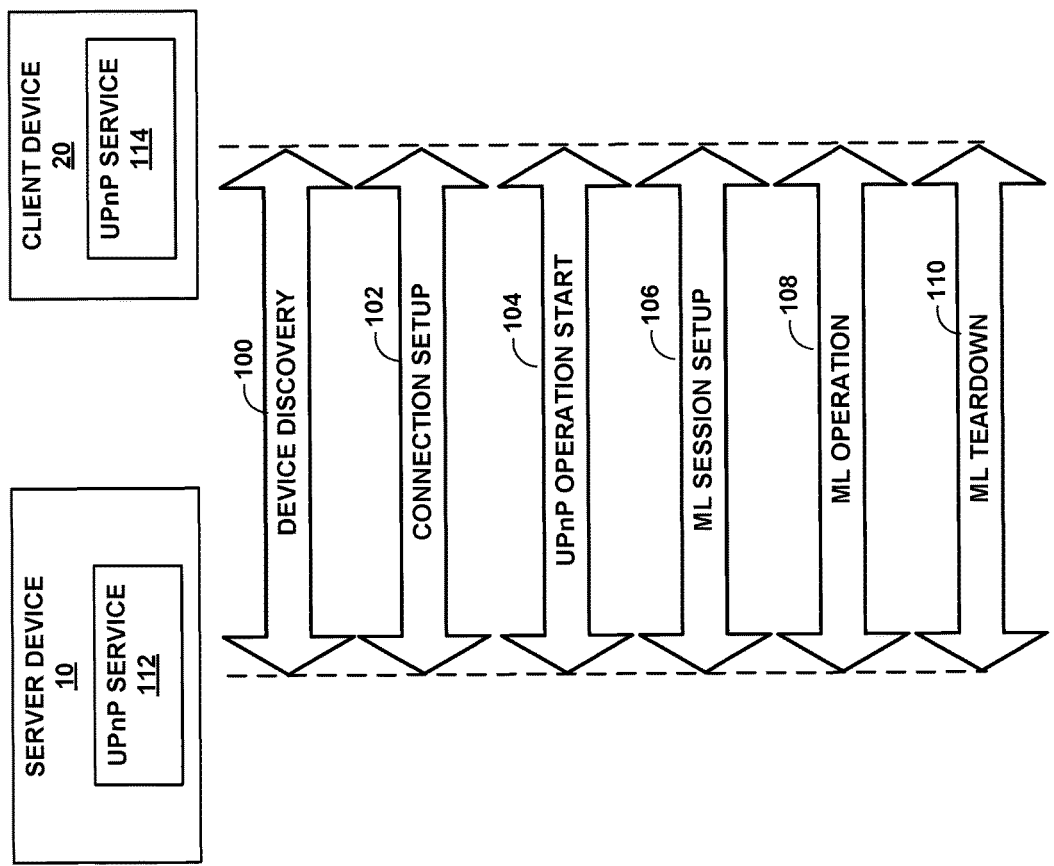
FIG. 2 is a flowchart illustrating an example operation of components of a vehicle head unit to establish a MirrorLink™ session in accordance with the techniques of this disclosure.

FIG. 2 is a flowchart illustrating an example operation of components of a vehicle head unit to establish a MirrorLink™ session in accordance with the techniques of this disclosure. The example operation is described with respect to server device 10 and client device 20 of FIG. 1. In the example of FIG. 2, server device 10 and client device 20 include UPnP service 112, and UPnP service 114, respectively.

In the example of FIG. 2, server device 10 and client device 20 may execute the following phases: Device Discovery (100), Connection Setup (102), UPnP Operation Start (104), MirrorLink™ Session setup (106), and MirrorLink™ Operation (108), respectively. To terminate the MirrorLink™ session, the server device 10 and client device 20 may perform MirrorLink™ Teardown (110), respectively.

During device discovery 100, server device 10 and client device 20 may use Wi-Fi P2P probe request and probe responses to perform device detection, e.g., detect each other. During Wi-Fi Discovery 100, server device 10 and client device 20 first scan for another device by sending a P2P probe request using a Wi-Fi interface. The P2P probe requests comprises a Wi-Fi (Institute of Electrical and Electronics Engineers (IEEE) 802.11) management frame, which server device 10 or client device 20 may transmit over specific Wi-Fi channels (channels 1, 6, and/or 11 of the 2.4 Ghz Wi-Fi frequency band in some examples). When server device 10 or client device 20 receives a P2P probe request, the receiving device may transmit a P2P probe response to acknowledge the probe request. Server device 10 and client device 20 may communicate with each other after transmitting a probe request and probe response.

A transmitted P2P probe request frame or response may include a CCC IE. The CCC IE is described in greater detail with respect to FIG. 3, below. The CCC IE may indicate that the sending device supports MirrorLink™ in some examples. The CCC IE may also contain information related to one or more connection parameters of a MirrorLink™ session, if server device 10 and client device 20 establish a MirrorLink™ session. If the P2P Probe Request and response frames include the CCC IE, server device 10 and client device 20 may proceed to perform connection setup (102).

During connection setup 102, server device 10 and client device 20 establish a physical connection, for example using L2 communication session 30. For example, server device 10 and client device 20 may establish what is referred to as a P2P group. The P2P group may have a single group owner (GO). The GO may assign IP addresses to members of the group using a protocol, such as dynamic host configuration protocol (DHCP) in some examples. Additionally, server device 10 and client device 20 may be assigned an association identifier to indicate that they have associated with each other. In some examples, server device 10 may be the GO, or client device 20 may be the GO. In some examples, server device 10 and client device 20 may have previously established P2P group roles (GO and group members). In this case, server device 10 and client device 20 may assume their previous P2P group roles.

Server device 10 and client device 20 may perform the UPnP Operation Start phase 102 after negotiating IP addresses and/or P2P group membership. During UPnP Operation Start phase 102, UPnP service 112 of server device 10 and client device 20 may determine a URL (Uniform Resource Locator) hosted by server device 10 from which client device 20 retrieves additional information related to the MirrorLink™ service. In some cases, the URL may have been determined during a previous MirrorLink™ session. In some cases, server device 10 and client device 20 may not already know the URL, and may have to determine the URL associated with the MirrorLink™ information using a discovery protocol, such as Simple Service Discovery Protocol (SSDP).

Once client device 20 determines the URL for the device description, client device 20 may retrieve the server's device description using a hypertext transfer protocol (HTTP)-GET request. In response to the HTTP-GET request, server device 10 may transmit a list of supported remote user interface mechanisms for a MirrorLink™ session to server device 10. Server device 10 may transmit the list of supported remote user interface mechanisms in extensible markup language (XML) format. The list of supported remote user interface mechanisms is included in a list element, referred to as "X_presentation." Examples of remote user interface interfaces include VNC over USB, VNC over Wi-Fi, Wi-Fi Display, HSML (High-Speed Media Link), and HTML (Hypertext Markup Language).

However, the MirrorLink™ standard does not include a presentation value that indicates that a device supports WSB over MirrorLink™. In some examples, the techniques of this disclosure may include the addition of a new possible value to the presentation/X_presentation element. The presence of the new X_presentation element value may indicate that a device supports WSB over MirrorLink™. Additionally, this disclosure may utilize additional information elements that may be present when server device 10 and client device 20 perform a capability exchange using UPnP during UPnP operation start 104. Table 1, below, illustrates the elements and potential values of the elements in accordance with one or more examples of the techniques of this disclosure.

TABLE 1

MirrorLink ™ Client and Server Capability Exchanged via UPnP

| Element | Possible Values |
| --- | --- |
| Presentation/X_presentation | Hsml, wfd, vncu, html, WSB |
| Services | WSB, or any other service |
| Preferred Presentation/X_presentation | WSB |
| Preferred Services | WSB |

The techniques of this disclosure may include the services, preferred presentation/X_presentation, and preferred services elements as XML elements included client and server device capability exchange process of UPnP operation start 104. The services element indicates protocols that server device 10 supports. Examples of supported services include WSB, Miracast, and other services. The X_presesentation element indicates services or protocols which may be used for presentation of audiovisual data, e.g. for mirroring the screen of server device 10 onto client device 20. Examples of potential values of the X_presentation element may include HSML, WFD, VNCU, HTML, and WSB, as some non-limiting examples.

The value of the preferred services element allows server device 10 indicate a preferred service to use in conjunction with MirrorLink™ session 32. An example of the XML that may be transmitted during the capability exchange, which includes the "Services" element of Table 1 is as follows:

```
<xs:element name="Services">
  <xs:complexType>
    <xs:sequence>
      <xs:element name="Service" type="xs:string">
    </xs:sequence>
  </xs:complexType>
</xs:element>
```

Server device 10 may also transmit a preferred presentation/X_presentation element data during the capability exchange using XML in a manner similar to that described above with respect to the services element. The value of the preferred presentation/X_presentation element indicates a preferred service to use for screen mirroring. As an example, the value of the preferred presentation/X_presentation element may be a subset of the values of the presentation/X_presentation element values. UPnP service 112, and UPnP service 114 may transmit similar XML data during the device capability exchange of UPnP operation start 104 for the other elements described with respect to Table 1.

After retrieving the server device description, server device 10 and client device 20 may perform MirrorLink™ session setup. During MirrorLink™ session setup 106, server device 10 and client device 20 may select a remote user interface to use during a MirrorLink™ session. Server device 10 and client device 20 may determine the remote user interface based on a physical interface (e.g., wired or a wireless interface) via which server device 10 and client device 20 are connected. Additionally, server device 10 and client device 20 may negotiate the remote user interface based on the preferred remote user interface element exchanged during UPnP operation start 104. Once server device 10 and client device 20 agree upon a MirrorLink™ remote user interface protocol based on the device capability exchange described above, server device 10 and client device 20 may establish a MirrorLink™ session (e.g., MirrorLink™ session 32 of FIG. 1).

After server device 10 and client device 20 complete MirrorLink™ session setup 106, server device 10 and client device 20 may communicate using the established MirrorLink™ session using the selected remote user interface protocol. At some point, server device 10 and client device 20 may teardown the MirrorLink™ session during MirrorLink™ teardown phase 110.

Figure 3:
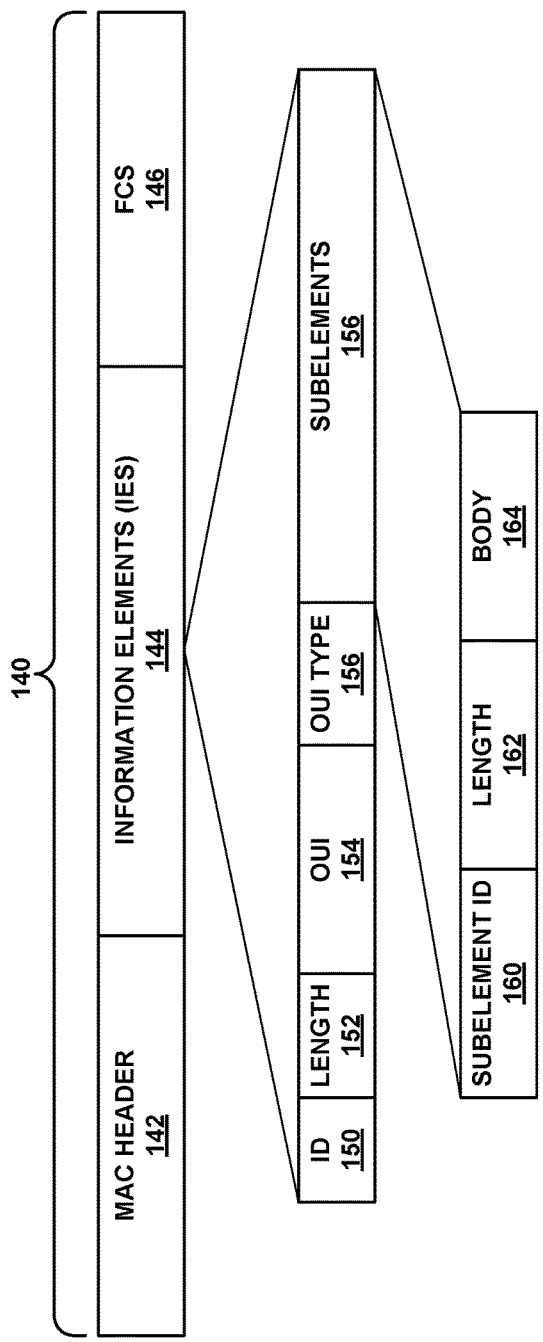
FIG. 3 is a conceptual diagram illustrating a Car Connectivity Consortium Information Element (CCC IE).

FIG. 3 is a conceptual diagram illustrating a CCC IE of an IEEE 802.11 management frame. FIG. 3 illustrates an IEEE 802.11 management frame 140 that server device 10 and client device 20 may transmit or receive. Management frame 140 includes a machine access code (MAC) header 140, information elements (IEs) 144, and frame check sequence (FCS) 146.

IEs 144 may also include the following fields: element ID 150, length 152, organizational unique identifier (OUI 154), OUI type 156, and subelements 156. In accordance with the techniques of this disclosure, element ID 150 may have hexadecimal value 0xDD, OUI field 154 may have hexadecimal value 0x04-DF-69, and OUI type field 156 may have a decimal value of 10. The value of length field 152 may be equal to the sum of the lengths in bytes of OUI field 154, OUI type field 156, and subelements 156.

Subelements 156 may include a number of additional fields that may be present within frame 140. Each subelement includes a subelement ID field 160, a length field 162, and a subelement body field 164. The value of the subelement ID field identifies the particular subelement. The length field indicates the length of subelement body field 164.

In some examples, subelements 156 may include a UPnP device information subelement, and an internet accessibility subelement. The UPnP device information subelement may include values that indicate whether a particular device is a UPnP server or control point. Table 2 defines some fields of the MirrorLink™ UPnP Device Information Subelement, which is one of subelements 156.

TABLE 2

UPnP Device Information Subelement

| Field | Value |
| --- | --- |
| UPnP Device Type | Server/Control Point/Reserved |
| TmApplicationServer:1 Service | Supported/Not supported |
| TmClientProfile:1 Service | Supported/Not Supported |
| TmNotificationServer:1 Service | Supported/Not Supported |
| Port Number | Port Number, used to make URL for UPnP device description fetching |

The body of the Internet accessibility subelement may indicate whether a device is configured to act as a MirrorLink™ server or MirrorLink™ client, whether the device has or requires Internet access, as well as other MirrorLink™ client preferences. Table 3 describes some fields of the MirrorLink™ Internet Accessibility Subelement, which may comprise one of subelements 156.

TABLE 3

CCC IE Internet Accessibility Subelement

| Field | Value |
| --- | --- |
| MirrorLink Type | MirrorLink Server/MirrorLink Client with support for single MirrorLink Server/MirrorLink Client with support for multiple MirrorLink Servers/Reserved |
| Internet Access Support | Supported/Not Supported |
| MirrorLink Client Preference | MirrorLink Client's preference in case where GO role conflict happens: No conflict or not a MirrorLink Client/Internet Access Required/Multiple MirrorLink Server Support |

Figure 4:
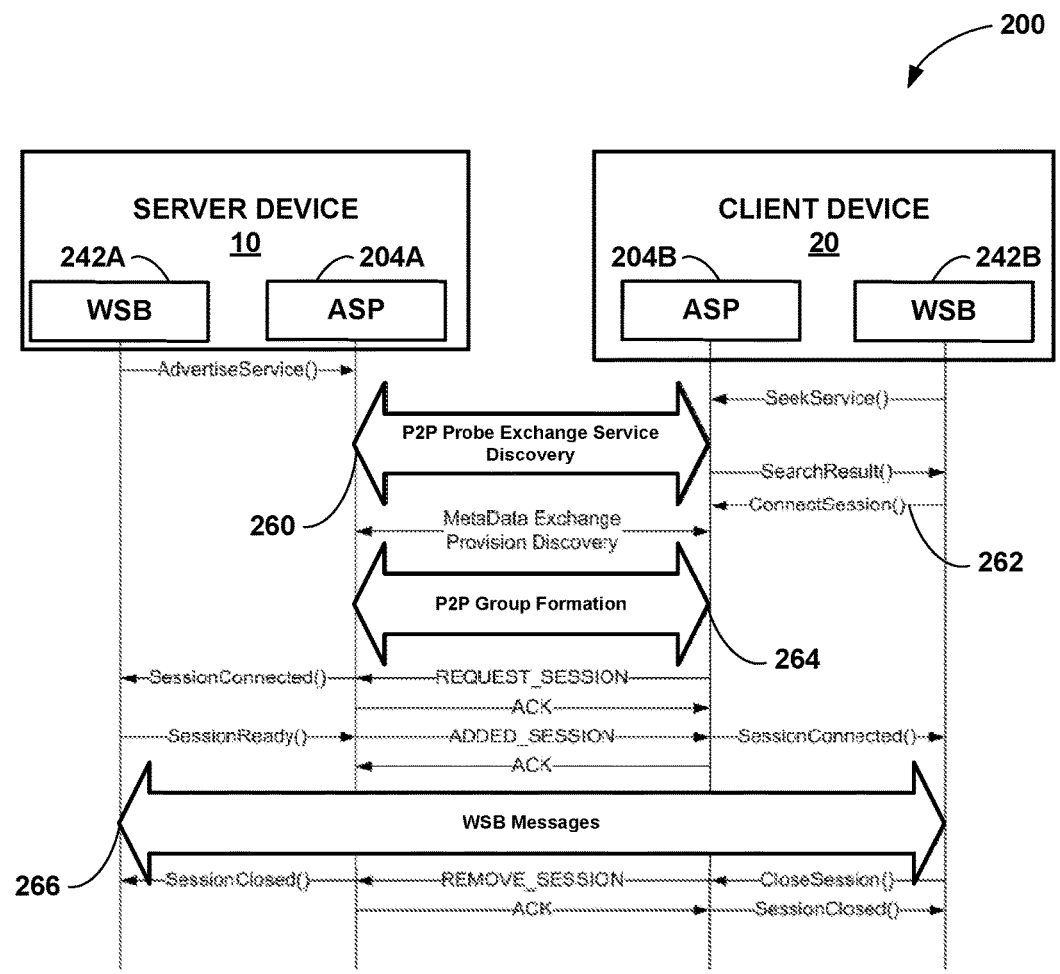
FIG. 4 is a communication diagram illustrating a flow 200 for server device 10 and client device 20 to exchange wireless communications with each other for advertising, seeking, establishing, operating, and tearing down a WSB session using a wireless Application Service Platform (ASP).

FIG. 4 is a communication diagram illustrating a flow 200 for server device 10 and client device 20 to exchange wireless communications with each other for advertising, seeking, establishing, operating, and tearing down a WSB session using a wireless Application Service Platform (ASP). In the example of FIG. 4, server device 10 and client device 20 may each be configured to operate a WSB service 242 and an ASP 204. The WSB 242 may communicate directly through the ASP 204 via L2 communication session 30 as shown in FIG. 1. In particular, server device 10 may be configured to operate WSB service 242A through ASP 204A, and client device 20 may be configured to operate WSB service 242B through ASP 204B. WSB service 242A may operate WSB communications for server device through ASP 204A, and WSB 242B may manage WSB communications for client device 20 through ASP 204B.

In some examples, ASP 204A and 204B provide a standard set of messages, referred to as "primitives." The primitives comprise a series of messages which ASP-compliant devices may use to advertise, and seek a particular service, to setup a session of a service and to teardown a particular service.

A device configured in accordance with the techniques of this disclosure, such as server device 10 and client device 20 may initially seek or advertise a WSB service using ASP 204. To advertise the WSB service server device 10 and client device 20 may use AdvertiseService( ) and SeekService( ) "primitives" of ASP 204. The execution AdvertiseService( ) and SeekService( ) primitives may cause server device 10 or client device 20 to perform device discovery by transmitting a P2P probe request or probe response frame in a manner similar to device discovery phase 100 of FIG. 2.

As part of P2P probe exchange service discovery phase 260, WSB 242A may construct the AdvertiseService( ) communication using the following form: AdvertiseService (service_name, port, proto, share, auto_accept, service_information), where service_name, port, porto, share, auto_accept, and service_information are arguments (i.e., parameters) of the AdvertiseService method. The service name argument may be a name or a hash of the sought service. The port may be a port number for the sought service. The proto (protocol) argument indicates the protocol to use for the sought service, such as TCP or UDP (universal datagram protocol). The auto_accept argument, may indicates whether a particular service automatically accepts a connection request, and may be set to true or false. The service_information argument may include additional information related to the service being sought.

As part of the P2P probe exchange and service discovery phase 260, WSB 242B of server device 10 may initially generate a SeekService( ) communication. The SeekService( ) communication is used to search for particular services. WSB 242B communicates the SeekService( ) communication to ASP 204B of client device 20 to manage its communications external to server device 10. WSB 242B may structure the SeekService( ) communication 504 in the form of SeekService(service_name, exact_search, mac_address, service_information_request), where service_name, exact_search, mac_address, and service_information_request are arguments or parameters of the SeekService method. The arguments of the SeekService( ) primitive are similar to those described with respect to the AdvertiseService( ) method.

The P2P Probe Request frames may also include an indication of the service that server device 10 or client device 20 is seeking or advertising. The indication may comprise, for example, a hash or a text string associated with the service that is being sought or advertised. The process of performing device discovery and service discovery is encompassed in P2P Probe Exchange Discovery phase 502.

Responsive to P2P Probe Exchange Discovery phase 502, server device 10 and client device 20 may perform P2P group formation 504. During P2P Probe Exchange Discovery phase 502, server device 10 and client device 20 may establish a P2P group and a P2P GO, similar to connection setup phase 102 of FIG. 2.

If both server device 10 and client device 20 support the sought or advertised WSB service, server device 10 and client device 20 may use ASP 204 to establish a session of the WSB service. To establish the session, server device 10 and client device 20 may transmit and/or receive the ConnectSession( ) and SessionConnected( ) ASP primitives.

As shown in FIG. 4, WSB 242A of server device 10 and WSB 242A of client device 20 may initially engage in P2P probe exchange and service discovery. To begin probe exchange and service discovery, server device 10 may generate an AdvertiseService( ) communication 502. In this example, WSB 242A communicates the AdvertiseService( ) communication 502 to ASP 204A of server device 10 to manage its communications external to server device 10 WSB 242A may structure the AdvertiseService( ) communication 502 in the form of AdvertiseService (service name, port, proto, share, auto_accept, service information), where service name, port, porto, share, auto_accept, and service information are arguments of the AdvertiseService method. The port may be a port number associated with the WSB service. The proto (protocol) argument, indicates the protocol used to transmit WSB data. The auto_accept argument may indicate whether a service, such as WSB, automatically accepts a connection request. The service information argument may include additional information related to the advertised service.

As part of the P2P probe exchange and service discovery, WSB 242B of server device 10 may initially generate a SeekService( ) communication 504. The SeekService( ) communication is used to search for certain services. WSB 242B communicates the SeekService( ) communication 504 to ASP 204B of client device 20 to manage its communications external to server device 10. WSB 242B may structure the SeekService( ) communication 504 in the form of SeekService(service name, exact search, mac_address, service_information_request), where service_name, exact search, mac_address, and service_information_request are arguments or parameters of the SeekService method.

The service_name argument may contain the name of the service that server device 10 is seeking. In some examples, the service_name argument may be a prefix of a service name, depending on the value of the exact_search argument. The exact_search argument defines whether ASP 204 sends a hash of the service name. If exact_search is true, then ASP 204 sends a hash of the service. If exact_search is false, ASP 204 does not send a hash. The mac_address parameter contains the MAC address of a P2P device if services are being sought from that particular device. The MAC address argument is blank if the ASP is to search for the sought service on all proximally located Wi-Fi direct devices. The service_information_request argument may include a list of strings that identify additional parameters associated with a sought service.

Responsive to P2P probe exchange service discovery phase 260, ASP 204B may generate and transmit a SearchResult( ) message to WSB 242B. WSB 242B at client device 20 may then request a WSB service from client device 20 by sending a ConnectSession( ) communication 262. In particular, WSB 242B may structure the ConnectSession( ) communication 506 in the form of ConnectSession(service_mac, advertisement_id, session_information, network_role). The service_mac argument may indicate a MAC address of the wireless server device 10, which server device 10 determined from the SearchResult( ) primitive.

Responsive to performing P2P group formation phase 264, ASP 204A and ASP 204B may transmit a Request_Session message from wireless client device 20 to server device 10. The REQUEST_SESSION message may include opcode, sequence number, session_mac, session_id, advertisement_id, session_information_length, and session_information. In various examples, the opcode argument may have a value of 0x00. The sequence number may have a sequence value assigned at transmission time. The session_mac argument has the value of the MAC address used in combination with the session_id and is used to identify the current ASP session. The session_id is the value of the ID that identifies the ASP session. The advertisement_id value is an identifier that references a service advertised by server device 10. The session_information_length argument is the length (in number of octets) of the session_information, and the session_information parameter is a variable-length parameter that includes session_information data if received in the ConnectSession ( ) primitive.

WSB 242A of server device 10 may inform ASP 204A of server device 10 that a WSB service session is ready by generating a SessionReady( ) communication. WSB 242A may structure the SessionReady( ) communication in the form of SessionReady(session_mac, session_id), where session_mac, and session_id are arguments as defined above. WSB 242A of client device 20 may send the SessionReady( ) communication after confirming that an incoming service port has been bound. Once ASP 204A receives the SessionReady( ) communication 508 from WSB 242A, ASP 204A may inform ASP 204B that the WSB is ready by communicating an Added_Session message. ASP 204B may respond to this message by providing a SessionConnected( ) communication to WSB 242B at client device 20.

With the session connection messages exchanged, WSB 242A and WSB 242B may go on to exchange WSB messages with each other (266) via the established WSB session (e.g., WSB session 34 of FIG. 1). Once the WSB session is finished, WSB 242A and WSB 242B may manage teardown of the WSB session through ASP 204A and ASP 204B.

As described above with respect to FIG. 2, server device 10 and client device 20 may transmit a P2P Probe request and/or Probe Response frame that includes a CCC IE to indicate that server device 10 or client device 20 supports the MirrorLink™ suite of protocols. However, the AdvertiseService( ) and SeekService( ) primitives transmitted during P2P Probe Exchange Service Discovery phase 260 do not include the information that is included within the CCC IE.

The techniques of this disclosure modify the AdvertiseService( ) and SeekService( ) and/or other ASP primitives to include an additional field that includes information from the CCC IE. As an example, one or more ASP primitives may include a MIRRORLINK_CONFIG argument. The MIRRORLINK_CONFIG argument may include field values including, but not limited to: UPnP Device Type, the TMTmApplicationServer:1 Service, TmClientProfile:1 Service, TmNotificationServer:1 Service, and Port Number fields, as described above with respect to Table 2. The MIRRORLINK_CONFIG argument may be alternatively named in some examples.

In accordance with the techniques of this disclosure, the MIRRORLINK_CONFIG argument may also include the elements of the Internet accessibility subelement of the CCC as described in Table 3, above. The elements may include MirrorLink™ Type, Internet Access Support, and MirrorLink™ Client Preference fields.

Server device 10 and client device 20 may send service query and response frames to each other to determine whether each device supports a particular service. In the case of MirrorLink, server device 10 and client device 20 may transmit a frame that includes a CCC information element (IE). The CCC IE indicates that the device sending the frame supports CCC services, such as MirrorLink™.

Figure 5:
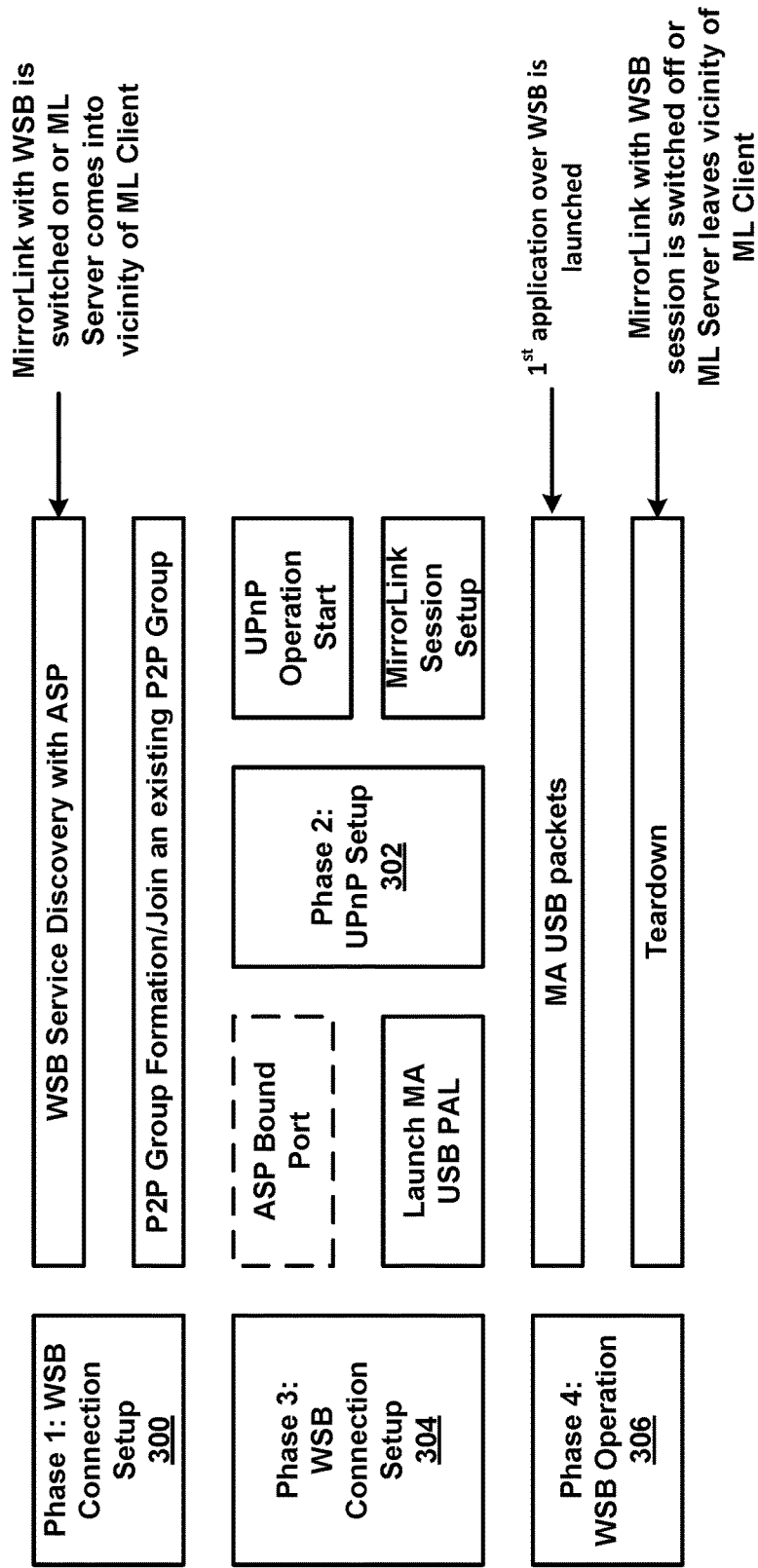
FIG. 5 is a conceptual diagram illustrating a process for utilizing WSB in conjunction with MirrorLink™ in accordance with the techniques of this disclosure.

FIG. 5 is a conceptual diagram illustrating a process for utilizing WSB in conjunction with MirrorLink™ in accordance with the techniques of this disclosure. FIG. 5 illustrates WSB connection setup phase 1 (300), UPnP Setup phase 2 (302), WSB Connection Setup phase 3 (304), and WSB Operation Phase 4 (306). During phase 1 (300), server device 10 and client device 20 may engage in pre-association discovery using an ASP. In accordance with the techniques of this disclosure, server device 10 and client device 20 may engage in WSB service discovery using ASP primitives that include one or more arguments that include information included within a CCC IE, as described in table 1, above. After performing service discovery, server device 10 and client device 20 may engage in P2P group formation or join an existing P2P group.

During phase 2 (302), server device 10 and client device 20 may engage in UPnP set to setup a MirrorLink™ session. As part of the UPnP session, server device 10 and client device 20 may exchange information related to WSB services, as described in table 1, and using MirrorLink™ in some examples, as described above. Responsive to client device 20 and server device 10 engaging in service discovery using the Wi-Fi Direct ASP, UPnP service 112 and UPnP service 114 may commence the UPnP start operation as described in step 104 of FIG. 2. UPnP service 112 and UPnP service 114 may perform MirrorLink™ Session setup responsive to performing UPnP Operation Start.

During phase 3 (304), server device 10 and client device 20 may use ASP 204 to bind a port to the WSB service. Additionally, server device 10 and client device 20 may launch a MA USB PAL (Media Agnostic USB Protocol Adaptation Layer) to interface between a traditional USB device and the WSB protocol.

Responsive to phases 2 and 3, server device 10 and client device 20 may perform WSB Operation (phase 4 (306). During WSB Operation Phase 306, server device 10 and client device 20 may transmit WSB packets, and launch one or more applications over MirrorLink™ using WSB. Finally, if server device 10 or client device 20 switches off the MirrorLink™ or the devices leave communication range of each other, server device 10 and/or client device 20 may perform teardown of the WSB session, e.g. using the ASP.

Figure 6:
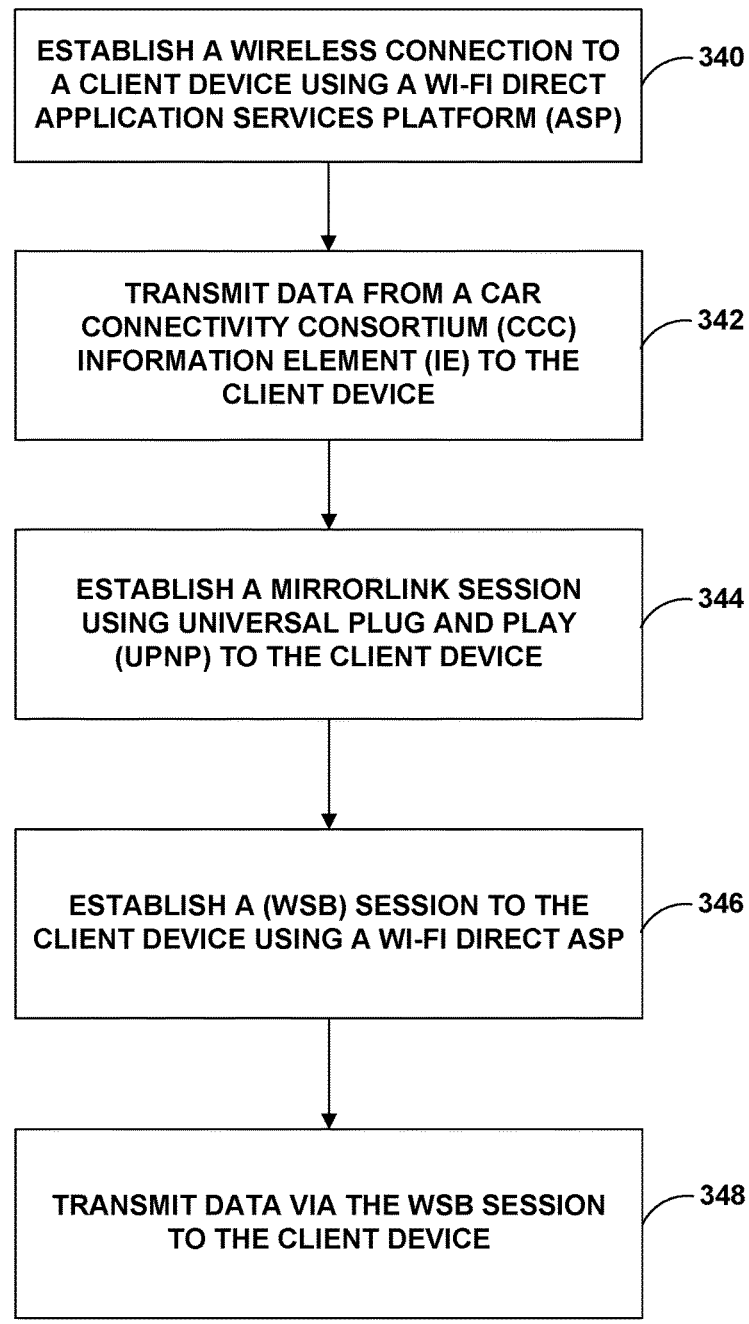
FIG. 6 is a flow diagram illustrating a process for establishing a MirrorLink™ session that utilizes WSB in accordance with one or more techniques of this disclosure.

FIG. 6 is a flow diagram illustrating a process for establishing a MirrorLink™ session that utilizes WSB in accordance with one or more techniques of this disclosure. The process of FIG. 6 may be performed by a computing device, such as client device 20 and server device 10 of FIG. 1.

In the process of FIG. 6, server device 10 may be configured to establish a wireless connection to client device 20 using a Wi-Fi Direct Application Services Platform (ASP) (340), and transmit data from a car connectivity consortium (CCC) Information Element (IE) to client device 20 (342), e.g. using a Wi-Fi Direct ASP. Server device 10 may be further configured to establish a MirrorLink session using Universal Plug and Play (UPnP) to the client device 20 via the wireless connection (344). Server device 10 may be further configured to establish a Wireless Serial Bus (WSB) session to client device 20 using the Wi-Fi Direct ASP via the wireless connection (346), and transmit data via the WSB session to client device 20 (348).

In some examples, to establish the MirrorLink session using UPnP, server device 10 may be further configured to: transmit XML (extensible markup language) data indicating a preferred remote user interface for the MirrorLink session to client device 20, and establish the MirrorLink™ session based on the preferred remote user interface. The preferred remote user interface may be a WSB interface.

In some examples, to establish the MirrorLink session using UPnP, server device 10 may be further configured to: transmit XML (extensible markup language) data indicating a list of supported remote user interface capabilities to client device 20, and establish the MirrorLink session using a remote user interface of the supported remote user interface capabilities. The list of supported remote user interfaces may include a WSB interface.

In some examples, server device 10 may be further configured to perform quality of service (QoS) management on the MirrorLink session. To perform quality of service management, server device 10 may be further configured to adjust bandwidth utilization of one of a plurality of streams associated with the MirrorLink session to improve an experience of a user of the MirrorLink session. Server device 10 may also be further configured to tear down the WSB session.

In some examples, to transmit the data from the CCC IE, server device 10 may be configured to: transmit the data from the CCC IE to client device 20 as part of an argument in an ASP primitive using the Wi-Fi Direct ASP of the wireless connection.

Figure 7:
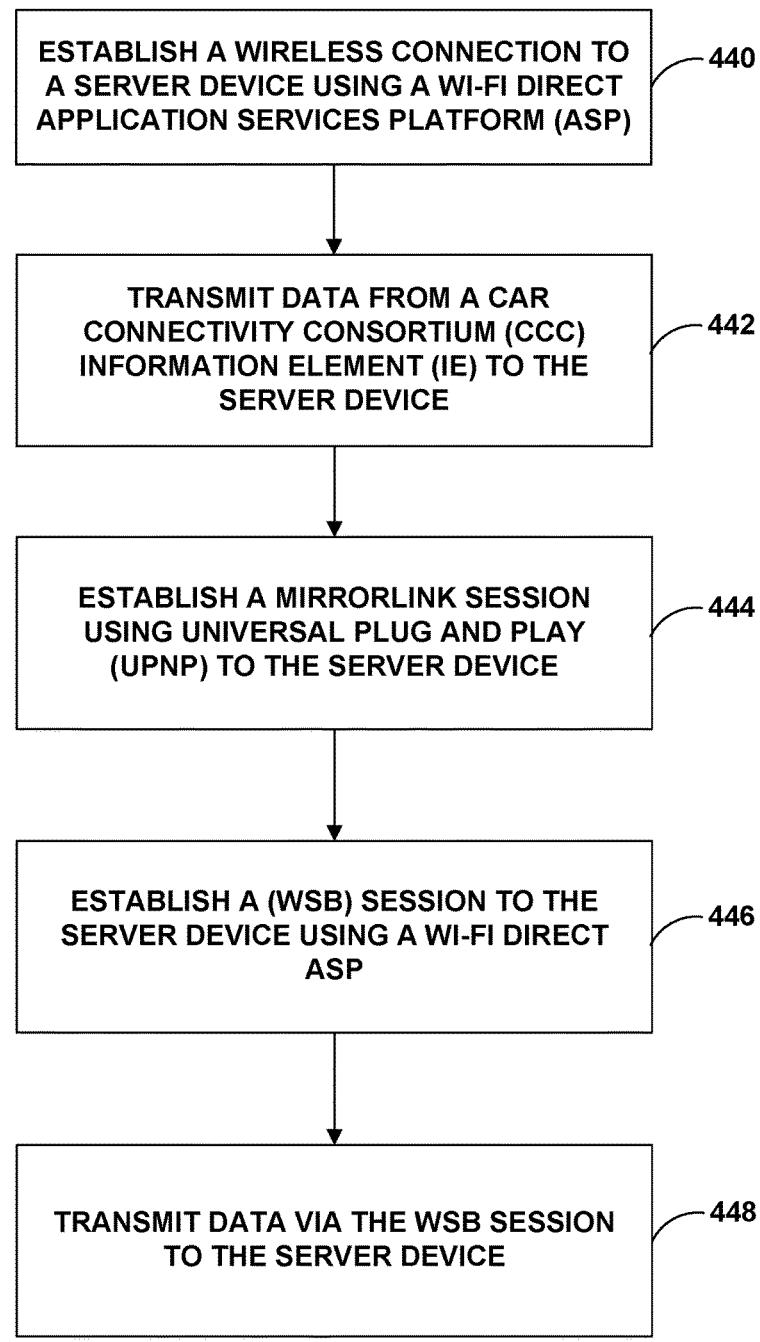
FIG. 7 is a flow diagram illustrating a process for establishing a MirrorLink™ session that utilizes WSB in accordance with one or more techniques of this disclosure.

FIG. 7 is a flow diagram illustrating a process for establishing a MirrorLink™ session that utilizes WSB in accordance with one or more techniques of this disclosure. The process of FIG. 7 may be performed by a computing device, such as client device 20 of FIG. 1.

In the process of FIG. 7, client device 20 may be configured to establish a wireless connection to server device 10 using a Wi-Fi Direct Application Services Platform (ASP) (440), and transmit data from a car connectivity consortium (CCC) Information Element (IE) to server device 10 (442), e.g. using a Wi-Fi Direct ASP. Client device 20 may be further configured to establish a MirrorLink session using Universal Plug and Play (UPnP) to the server device 10 via the wireless connection (444). Client device 20 may be further configured to establish a Wireless Serial Bus (WSB) session to server device 10 using the Wi-Fi Direct ASP via the wireless connection (446), and transmit data via the WSB session to server device 10 (448).

In some examples, to establish the MirrorLink session using UPnP, client device 20 may be further configured to: transmit XML (extensible markup language) data indicating a preferred remote user interface for the MirrorLink session to server device 10, and establish the MirrorLink™ session based on the preferred remote user interface. The preferred remote user interface may be a WSB interface.

In some examples, to establish the MirrorLink session using UPnP, client device 20 may be further configured to: transmit XML (extensible markup language) data indicating a list of supported remote user interface capabilities to server device 10, and establish the MirrorLink session using a remote user interface of the supported remote user interface capabilities. The list of supported remote user interfaces may include a WSB interface.

In some examples, client device 20 may be further configured to perform quality of service (QoS) management on the MirrorLink session. To perform quality of service management, client device 20 may be further configured to adjust bandwidth utilization of one of a plurality of streams associated with the MirrorLink session to improve an experience of a user of the MirrorLink session. Client device 20 may also be further configured to tear down the WSB session.

In some examples, to transmit the data from the CCC IE, client device 20 may be configured to: transmit the data from the CCC IE server device 10 as part of an argument in an ASP primitive using the Wi-Fi Direct ASP of the wireless connection.

In one or more examples, the functions described may be implemented in hardware, software, firmware, or any combination thereof. If implemented in software, the functions may be stored on or transmitted over as one or more instructions or code on a computer-readable medium. Computer-readable media may include computer readable storage media that is non-transitory or transitory communication media including any medium that facilitates transfer of a computer program from one place to another. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, Flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Example vehicles that can employ techniques of this disclosure include automobiles, trucks, watercrafts, aircrafts, all-terrain vehicles (ATV's), snowmobiles, motorcycles, tanks or other military vehicles, semi-trucks or other transportation vehicles, bulldozers, tractors or other heavy machinery, trains, golf carts, or any other types of vehicles. A wide variety of vehicle data and processing of such data is contemplated in examples according to this disclosure.

Various embodiments of the invention have been described. These and other embodiments are within the scope of the following claims.

What is claimed is:

1. A method of wirelessly transmitting data, the method comprising:
   establishing a wireless connection between a first computing device and a second computing device;
   establishing, via the wireless connection, a data communication session between the first computing device and the second computing device using Universal Plug and Play, wherein establishing the data communication session between the first computing device and the second computing device using Universal Plug and Play comprises transmitting or receiving, using Universal Plug and Play, data indicative that a supported remote user interface includes Wireless Serial Bus; and
   establishing, for use with the established data communication session, a Wireless Serial Bus session between the first computing device and the second computing device based on the data indicative that the supported remote user interface includes Wireless Serial Bus.

2. The method of claim 1, wherein the data indicative that the supported remote user interface includes Wireless Serial Bus comprises at least one of:
   data indicative of a preferred remote user interface for the data communication session; or
   a list of supported remote user interfaces.

3. The method of claim 2, wherein the preferred remote user interface is Wireless Serial Bus, or wherein the list of supported remote user interfaces includes Wireless Serial Bus.

4. The method of claim 1, wherein the data indicative that the supported remote user interface includes Wireless Serial Bus is extensible markup language data.

5. The method of claim 1, further comprising transmitting, by the first computing device and to the second computing device, data via the Wireless Serial Bus session.

6. The method of claim 1, further comprising performing quality of service management on the data communication session,
   wherein performing quality of service comprises adjusting bandwidth utilization of one of a plurality of streams associated with the data communication session to improve an experience of a user of the data communication session.

7. The method of claim 1, further comprising tearing down, by the first computing device, the Wireless Serial Bus session.

8. A first computing device comprising:
   a memory; and
   at least one processor, wherein the at least one processor is configured to:
   establish a wireless connection with a second computing device;
   establish, via the wireless connection, a data communication session with the second computing device using Universal Plug and Play, wherein to establish the data communication session with the second computing device using Universal Plug and Play, the at least one processor is configured to transmit or receive, using Universal Plug and Play, data indicative that a supported remote user interface includes Wireless Serial Bus; and
   establish, for use with the data communication session, a Wireless Serial Bus session with the second computing device based on the data indicative that the supported remote user interface includes Wireless Serial Bus.

9. The first computing device of claim 8, wherein the data indicative that the supported remote user interface includes Wireless Serial Bus comprises at least one of:
   data indicative of a preferred remote user interface for the data communication session; or
   a list of supported remote user interfaces.

10. The first computing device of claim 9, wherein the preferred remote user interface is Wireless Serial Bus, or wherein the list of supported remote user interfaces includes Wireless Serial Bus.

11. The first computing device of claim 8, wherein the data indicative that the supported remote user interface includes Wireless Serial Bus is extensible markup language data.

12. The first computing device of claim 8, wherein the at least one processor is further configured to transmit data stored in the memory via the Wireless Serial Bus session to the second computing device.

13. The first computing device of claim 8, wherein the at least one processor is further configured to perform quality of service management on the data communication session,
wherein to perform quality of service management, the at least one processor is further configured to adjust bandwidth utilization of one of a plurality of streams associated with the data communication session to improve an experience of a user of the data communication session.

14. The first computing device of claim 8, wherein the at least one processor is further configured to tear down the Wireless Serial Bus session.

15. A non-transitory computer-readable storage medium that includes instructions stored thereon that, when executed, cause at least one processor of a first computing device to:
establish a wireless connection with a second computing device;
establish, via the wireless connection, a data communication session with the second computing device using Universal Plug and Play, wherein to establish the data communication session with the second computing device using Universal Plug and Play, the at least one processor is configured to transmit or receive, using Universal Plug and Play, data indicative that a supported remote user interface includes Wireless Serial Bus; and
establish, for use with the data communication Session, a Wireless Serial Bus session with the second computing device based on the data indicative that the supported remote user interface includes Wireless Serial Bus.

16. The non-transitory computer-readable storage medium of claim 15, wherein the data indicative that the supported remote user interface includes Wireless Serial Bus comprises at least one of:
data indicative of a preferred remote user interface for the data communication session; or
a list of supported remote user interfaces.

17. The non-transitory computer-readable storage medium of claim 16, wherein the preferred remote user interface is Wireless Serial Bus, or wherein the list of supported remote user interfaces includes Wireless Serial Bus.

18. The non-transitory computer-readable storage medium of claim 15, wherein the data indicative that the supported remote user interface includes Wireless Serial Bus is extensible markup language data.

19. The non-transitory computer-readable storage medium of claim 15, further comprising instructions that, when executed, cause the at least one processor to transmit data via the Wireless Serial Bus session to the second computing device.

* * * * *